United States Patent
Gonda et al.

(10) Patent No.: US 8,154,464 B2
(45) Date of Patent: Apr. 10, 2012

(54) MAGNETIC MATERIAL ANTENNA AND FERRITE SINTERED BODY

(75) Inventors: Masayuki Gonda, Saitama (JP); Shigeo Fujii, Saitama (JP); Hiroyuki Aoyama, Saitama (JP)

(73) Assignee: Hitachi Metals, Ltd., Tokyo (JP)

( * ) Notice: Subject to any disclaimer, the term of this patent is extended or adjusted under 35 U.S.C. 154(b) by 548 days.

(21) Appl. No.: 12/308,661

(22) PCT Filed: Jun. 21, 2007

(86) PCT No.: PCT/JP2007/000666
§ 371 (c)(1),
(2), (4) Date: Feb. 10, 2009

(87) PCT Pub. No.: WO2007/148438
PCT Pub. Date: Dec. 27, 2007

(65) Prior Publication Data
US 2009/0273534 A1    Nov. 5, 2009

(30) Foreign Application Priority Data

Jun. 21, 2006  (JP) .................................. 2006-171429
Jun. 8, 2007  (JP) .................................. 2007-152229

(51) Int. Cl.
    *H01Q 1/38*    (2006.01)
(52) U.S. Cl. ..................................... 343/787; 252/62.63
(58) Field of Classification Search ........... 343/700 MS, 343/702, 787, 788, 895; 252/62.6, 62.63, 252/62.62
See application file for complete search history.

(56) References Cited

U.S. PATENT DOCUMENTS

| | | | |
|---|---|---|---|
| 5,892,490 A | 4/1999 | Asakura et al. | |
| 6,660,179 B2 * | 12/2003 | Umeda et al. | 252/62.6 |
| 7,482,977 B2 * | 1/2009 | Kuroda et al. | 343/700 MS |
| 2002/0050309 A1 | 5/2002 | Marusawa | |
| 2003/0052299 A1 | 3/2003 | Umeda et al. | |
| 2003/0091841 A1 | 5/2003 | Marusawa | |
| 2005/0253756 A1 | 11/2005 | Kuroda et al. | |

FOREIGN PATENT DOCUMENTS

| | | |
|---|---|---|
| JP | 49-40046 | 4/1974 |
| JP | 10-145123 | 5/1998 |
| JP | 2002-68830 | 3/2002 |
| JP | 2002-260911 | 9/2002 |
| JP | 2002-260912 | 9/2002 |
| JP | 2003-146739 | 5/2003 |
| JP | 2005-278067 | 10/2005 |
| WO | WO 96/15078 | 5/1996 |

* cited by examiner

*Primary Examiner* — Michael C Wimer
(74) *Attorney, Agent, or Firm* — McGinn Intellectual Property Law Group, PLLC

(57) ABSTRACT

A magnetic material antenna using a ferrite sintered body comprising one or more conductors disposed at least on a surface or in internal portion of the ferrite sintered body, wherein the ferrite sintered body is a sintered body of Y-type ferrite containing BaO, CoO, and $Fe_2O_3$ as main components and wherein the ferrite sintered body contains Cu and, in a cross section for the sintered body, an area rate of a cubic Co-rich phase, which has a ration of an amount of Co being higher than a Y-type ferrite phase being a mother phase, is 1% or less.

20 Claims, 5 Drawing Sheets

(a)  (b)

MAGNETIC MATERIAL ANTENNA AND FERRITE SINTERED BODY

TECHNICAL FIELD

The present invention relates to a magnetic material antenna to be used in electronic devices having communication functions, communication devices such as mobile phones, portable terminal devices in particular and to a ferrite sintered body that can be suitably applied to the magnetic material antenna.

BACKGROUND TECHNOLOGY

The frequency band used in communication devices such as mobile phones or wireless LANs (Local Area Networks) range from several hundred MHz to several MHz and it is required that the communication devices have high efficiency for wide band in the frequency band. Therefore, on the precondition that the antenna used for these devices is adapted to function as a high gain antenna operating in the band described above, it is further requested that, particularly, the antenna is small in size and short in height from the viewpoint of its use situation. Moreover, in the case of digital terrestrial broadcasting developed recently, it is necessary that the antenna to be used therein covers a wide frequency band such as 470 MHz to 770 MHz being now used as a television broadcasting band in Japan. Further, in digital broadcasting, for example, a band of 180 MHz to 210 MHz is being used in Korea and a band of 470 MHz to 890 MHz is being used in Europe. Accordingly, the advent of an antenna is expected which can be used in a band of frequencies being 180 MHz or more and also can be small in size and short in height so as to be mounted in communication devices such as mobile phones. Furthermore, in not only an antenna but also an electronic device such as a personal computer and a personal digital assistant, a signal transmission speed is made higher and a driving frequency is also made higher and, as a result, various kinds of inductance element to be used therefor have to be suitably corresponded to the high frequencies.

Conventionally, as a small-sized antenna suitably used in mobile communications, a chip antenna using a dielectric ceramic has been provided (for example, Patent Reference 1). With the frequency falling within a constant level, by using a dielectric of higher permittivity, the chip antenna can be made smaller in size. In the Patent Reference 1, an attempt is made to shorten a wavelength by using a meander electrode. Also, another antenna is proposed in which the miniaturization of an antenna is achieved by using a magnetic material having not only a higher relative permittivity $\epsilon r$ but also higher relative permeability $\mu r$ to shorten a wavelength by $1/(\epsilon r \cdot \mu r)^{1/2}$ times (see Patent Reference 2).

In the case where an antenna or inductance element is made of a magnetic material, for example, in the case where spinel ferrite such as Ni—Zn ferrite is used as the magnetic material, there was a limitation to the use in high frequency regions due to a phenomenon of so-called "Snoek's limit". To solve this problem, hexagonal ferrite is proposed as one of magnetic materials for an antenna which can maintain, owing to its direction of easy magnetization appearing within a plane being vertical to a C axis, its specified permeability until a frequency band exceeds a frequency limit (Snoek's limit) of the spinel ferrite (see Patent Reference 3). The Patent Reference 3 discloses that the Z-type ferrite, most grains of which have a single magnetic domain structure, can be effectively used in high frequency band in particular.

Patent Reference 1: Japanese Patent Application Laid-open No. Hei10-145123.
Patent Reference 2: Japanese Patent Application Laid-open No. Sho 49-40046.
Patent Reference 3: International Publication No. 96/15078 brochure.

DISCLOSURE OF THE INVENTION

Problems to be Solved by the Invention

Even in the case of the above dielectric chip antenna enabling the antenna to be small in size and short in height, when a helical-type radiation electrode is used, if the number of windings becomes large, its line capacitance is increased, causing a Q value to be higher. As a result, the bandwidth is made narrow, which makes it difficult to apply the chip antenna to the usage for digital terrestrial broadcasting or the like requiring a wide bandwidth. To solve this problem, by using a magnetic material instead of a dielectric, the increase in the number of windings can be avoided and there is a possibility that a wider bandwidth can be obtained when compared with the case using the dielectric. However, in the case where the Z-type ferrite is used as a magnetic material, permeability begins to become small at frequencies of several hundred MHz and a loss becomes large and, as a result, it is difficult to realize high antenna characteristics in a frequency range being not less than the several hundred MHz.

Thus, an object of the present invention is to provide a magnetic material antenna suitably employed in high frequency band and wide bandwidth and a ferrite sintered body for inductance elements to be used for the antenna and/or for high frequency devices.

Means for Solving Problems

The magnetic material antenna of the present invention is characterized by using a ferrite sintered body including one or more conductors disposed on at least one of a surface or internal portion of the ferrite sintered body, wherein the ferrite sintered body is a sintered body of Y-type ferrite containing BaO, CoO, and $Fe_2O_3$ as main component and wherein the ferrite sintered body contains Cu and, in a cross section of the sintered body, an area rate of a Co-rich phase is 1% or less. By using the Y-type ferrite, permeability can be maintained even at high frequencies. Therefore, by using inductance, excessive formation of capacitance can be prevented, which is attributable to the miniaturization of an antenna and widening of frequency bands of the antenna. Also, by containing Cu, the density of a sintered body is made high, which improves permeability. By using Cu, it is made possible to maintain excellent sintering properties in a low oxygen atmosphere, for example, even in an air atmosphere, thus improving productivity thereof. Moreover, by using Cu, the Co-rich phase occurs in the sintered body of the Y-type ferrite. The occurrence of the Co-rich phase is attributable to the improvement of sintering properties, however, too large amount of the Co-rich phase causes the vacancy rate to be smaller and loss factor at high frequencies becomes too large and, therefore, it is preferable that the Co-rich phase falls within the above range. Here, the Co-rich phase represents a phase in which a ratio of the Co content is high compared with the Y-type ferrite being a mother phase (hereinafter, the same). The amount of the Co-rich phase is preferably 0.6% or less and more preferably 0.4% or more.

Moreover, it is preferable that a vacancy rate P of the ferrite sintered body represented by $(d_t - d_s) \times 100/d_t$, where $d_t$ denotes a theoretical density and $d_s$ denotes a sintered body density, is 4% or more. By making the vacancy rate P be 4% or more, the loss factor that may affect a gain of an antenna decreases, whereby the above configuration can be suitably used in the antenna. If the vacancy rate exceeds 6%, loss is reduced rapidly which is more preferable. From a viewpoint of lowering further the loss factor and obtaining high antenna gain, the vacancy rate is more preferably 8% or more. Moreover, the vacancy rate P is preferably 15% or less. By configuring as above, it is possible to suppress the lowering of initial permeability and/or the decrease in strength of the sintered body.

It is preferable that volume resistivity of the ferrite sintered body is $1 \times 10^4 \Omega \cdot m$ or more. By using the Y-type ferrite sintered body, when one or more conductor is disposed on at least one of a surface or in an internal portion of the sintered body, sufficient insulation can be ensured.

Further, it is preferable that initial permeability at 1 GHz of the ferrite sintered body is 2 or more and loss factor tan δ is 0.05 or less. By configuring as above, a small-sized and wide-band antenna can be provided which has a high gain even in a band up to 1 GHz. The initial permeability at 1 GHz is preferably 2.5 or more.

The ferrite sintered body of the present invention is a ferrite sintered body of Y-type ferrite containing BaO, CoO, and $Fe_2O_3$ as main components, wherein Ba, Co, Cu, and Fe contained in the ferrite sintered body satisfies a compositional formula $Ba_2Co_{2-x}Cu_xFe_{12}O_{22}$ (x=0.05 to 0.2) and wherein, in a cross section of the sintered body, an area rate of a Co-rich phase is 1% or less. In the Y-type ferrite sintered body, by substituting Cu for Co, the growth of the Co-rich phase being a secondary phase can be suppressed. If the substitution ratio x of Cu for Co exceeds 0.2, the loss factor at high frequencies becomes large and, therefore, the substitution ratio x is preferably 0.2 or less. To make the loss factor tan δ be 0.05 or less, the Cu content is preferably within the above range. Also, if a large amount of Cu is contained, the volume resistivity is lowered, which causes it to be difficult to directly dispose a conductor on a surface or in the internal portion of the ferrite sintered body. On the other hand, in order to exert the effect of sufficiently improving the sintered body density and the permeability, the substitution ratio x is preferably 0.05 or more. The substitution ratio x is preferably 0.11 to 0.15. The Co-rich phase contained in the sintered body of the Y-type ferrite is attributable to the improvement of the sintering property, however, too large amount of the Co-rich phase causes the vacancy rate to be too small and, therefore, the Co-rich phase is within the above range. Furthermore, the amount of the Co-rich phase is preferably 0.6 or less and more preferably 0.4 or less. The above ferrite sintered body can be suitably used in, for example, the magnetic material antenna.

Another ferrite sintered body of the present invention is characterized in that a ferrite sintered body contains BaO, CoO, and $Fe_2O_3$ as main components, wherein the ferrite sintered body contains Cu of 0.1 to 0.6 weight parts in terms of CuO, with respect to 100 weight parts of the main components and wherein, in a cross section of the sintered body, an area rate of a Co-rich phase is 1% or less. Ibo small amounts of Cu content causes it difficult to raise the sintering property to reduce the vacancy rate and, on the other hand, the increase of the Cu content causes the vacancy rate to become small and loss factor at high frequencies to become large. Further, too large amounts of the Cu content causes the volume resistivity to become low, thus making it impossible to directly dispose the conductor on a surface or in an internal portion of the ferrite sintered body. If a large amount of CuO is contained, the Co-rich phase being a secondary phase increases. The Co-rich phase contained in the sintered body of the Y-type ferrite is attributable to the improvement of sintering property, however, too large amounts of the Co-rich phase causes the vacancy rate to become too small and, since the loss factor at high frequencies becomes larger, the amount of the Co-rich phase is preferably within the above range. To make the Co-rich be 1% or less, the amount of Cu is preferably within the above range. The ferrite sintered body can be suitably used for the magnetic material antenna. The existence of Cu affects the sintering properties and, if a large amount of Cu enters the Y-type ferrite, the loss factor becomes large and, therefore, it is preferable that the Cu content of the Y-type ferrite phase in the ferrite sintered body is smaller than the Cu content of the Co-rich phase. By configuring as above, the ferrite sintered body in which the vacancy rate is controlled can be provided while the low loss factor is being maintained.

It is preferable that the vacancy rate P of the ferrite sintered body represented by $(d_t-d_s) \times 100/d_t$, where $d_t$ denotes a theoretical density and $d_s$ denotes a sintered body density, is 4% or more. When the vacancy rate is 4% or more, the loss factor that may affect a gain of the antenna decreases and, therefore, the above configuration is suitably applied to the applications for the antenna. If the vacancy rate exceeds 6%, loss decreases rapidly, which is preferable. From the viewpoint that the loss factor is further decreased and a high gain antenna is obtained, the vacancy rate is preferably 8% or more. Besides, the vacancy rate is preferably 15% or less. By configuring as above, the decrease in initial permeability and/or strength of sintered body can be suppressed. The vacancy rate P is preferably 12.8%.

It is preferable that volume resistivity of the ferrite sintered body is $1 \times 10^4 \Omega \cdot m$ or more. By using the Y-type ferrite sintered body having the volume resistivity and being excellent in sintering properties, when one or more conductor is disposed on at least one of a surface or in an internal portion of the sintered body, sufficient insulation can be ensured.

It is preferable that initial permeability at 1 GHz of the ferrite sintered body is 2 or more and loss factor tan δ is 0.05 or less. By configuring as above, it is made possible to provide an antenna having a high gain in a frequency band of 1 GHz. It is more preferable that the initial permeability at 1 GHz is 2 or more.

Effect of the Invention

According to the present invention, it is possible to provide a magnetic antenna suitably used in a high frequency band and wide bandwidth and a ferrite sintered body for inductance elements to be suitably used for the antenna and/or for high frequency devices.

BEST MODE OF CARRYING OUT THE INVENTION

Hereinafter, the present invention is described by showing a specified embodiment but the present invention is not limited to the embodiment. The same reference number is assigned to the same components.

The ferrite sintered body of the present invention uses a ferrite sintered body of Y-type ferrite. The Y-type ferrite is, typically, hexagonal soft ferrite containing, for example, Ba, Co, Fe and O, as its main component, represented by the chemical formula $Ba_2Co_2Fe_{12}O_{22}$. The element Sr may be substituted for part of Ba and at least one kind of Ni, Zn, and Fe may be substituted for part of Co. Any ferrite sintered body may be used as the ferrite sintered body of the present invention so long as it has a structure including a Y-type ferrite phase as its main phase and the ferrite sintered body of the present invention contains preferably 20 to 23 mol % of BaO and 17 to 21 mol % of CoO, respectively, and remaining mol % of $Fe_2O_3$, and more preferably 20 to 20.5 mol % of BaO, 20 to 20.5 mol % of CoO, respectively, and remaining mol % of $Fe_2O_3$, as compositional elements. The Y-type ferrite maintains its permeability until the band of the high frequency reaches 1 GHz and, therefore, can be suitably used for the antenna operating in the band of the several hundred MHz. The hexagonal ferrite preferably has a structure including a Y-type single phase, however, there are some cases where other hexagonal ferrite such as Z-type, W-type hexagonal ferrite is produced or secondary phases of $BaFe_2O_4$ or the like are grown. Therefore, the structure of the ferrite sintered body of the present invention has the Y-type ferrite phase as its main phase, however, these secondary phases are allowed to appear in the ferrite sintered body of the present invention. Even a small amount of secondary phases appears during a sintering process, unlike the composite material, high strength of sintered body can be maintained. Moreover, to contain the Y-type phase as a main phase means that a maximum peak in a powder X-ray diffraction pattern is a peak of the Y-type ferrite phase.

The ferrite sintered body of the present invention contains Cu. In the case of the conventional method in which a large amount of Cu is substituted or in the case of $Cu_2Y$, a large amount of Cu enters the Y-type ferrite phase and, therefore, such sintered bodies are not appropriate for the antenna of the present invention. When a large amount of Cu is contained, a vacancy rate becomes too small and a Co-rich phase being a secondary phase increases and, as a result, the Cu content of the Y-type ferrite phase is increased, which causes a loss factor to be made large at high frequencies. Moreover, volume resistivity becomes remarkably low, which makes it difficult to directly dispose a conductor on the sintered body. The magnetic material antenna of the present invention is made up of a ferrite sintered body which contains Cu and 1% or less of the Co-rich phase being the secondary phase grown therein. The excellent magnetic material antenna is provided using the ferrite sintered body in which sintering property and permeability are improved by containing Cu and a low loss factor is achieved by controlling the Co-rich phase. The ferrite sintered body, when being used for an antenna requiring high volume resistivity, preferably contains 0.1 to 1.0 weight part of Cu in terms of CuO. By containing Cu in the content range described above, it is made possible to make the vacancy rate exceed 6% and to make the loss factor tan δ be 0.05 or less at 1 GHz. In order to make the rate of the Co-rich phase being a secondary phase be 1% or less and to further reduce the loss factor, it is preferable that 0.1 to 0.6 weight parts of Cuo is contained therein. When a small amount of Cu is added to the ferrite sintered body of Y-type ferrite, Cu content in the Y-type ferrite phase is smaller than that in the Co-rich phase. Since Cu is contained with priority in the Co-rich phase, sintering reaction progresses at lower temperature and, on the other hand, since the Cu content in the Y-type ferrite phase is low, the loss factor at high frequencies still remains maintained at a low level. In addition, the ferrite sintered body of the present invention may contain other elements such as Zn, Li, Mn, an Si and unavoidable impurities such as P. S, B, and Na.

Also, Cu may be added by substituting Co as described below. In this case, the composition of the sintered body of the Y-type ferrite is preferably represented as $Ba_2Co_{2-x}Cu_xFe_{12}O_{22}$ (x=0.05 to 0.2). In the method of substituting Cu for Co out of methods for adding Cu, when compared with the case where CuO is added to the main component, the Co-rich phase is hard to grow. In the method of substituting Cu for Co, even if the amount of Cu increases, the Co-rich phase is hard to appear, however, when the substitution ratio x of Cu for Co exceeds 0.2, the loss factor at high frequencies becomes large and the lose factor at 1 GHz exceeds 0.05. Further, if an amount of substitution for Co becomes too large, volume resistivity is lowered. On the other hand, if the substitution ratio x is less than 0.05, the effects of improving sintering properties and/or permeability are not sufficiently exerted.

As described above, the ferrite sintered body of the present invention allows phases other than the Y-type ferrite phase to be contained. Out of these phases, the Co-rich phase has an effect of improving sintering properties and, therefore, the ferrite sintered body may contain a specified amount of the phase. In this case, if the content ratio of the Co-rich phase becomes large, the loss factor becomes large and, if the ratio becomes too large in particular, frequency characteristics of initial permeability are lowered. Consequently, an area rate of the Co-rich phase in a cross section of the ferrite sintered body is preferably 1% or less. The area rate of the Co-rich phase is obtained by mirror-polishing cut surfaces of the ferrite sintered body and by observing the mirror-polished surface using an SEM (Scanning Electron Microscope) to read an area of the Co-rich phase in a predetermined area to be observed. The Co-rich phase contained in the sintered body of the Y-type ferrite is attributable to the improvement of the sintering properties, however, if the Co-rich phase is too much, the vacancy rate becomes too small and, in particular, the loss factor at high frequencies becomes large. Moreover, from the viewpoint that a low loss factor and high volume resistivity are to be obtained, an average crystal grain diameter of the Y-type ferrite phase in the sintered body is preferably 2 μm or less. It is preferable that the average crystalline grain diameter is small, however, from the viewpoint that, in order to increase the density of the sintered body, grain growth is required at time of sintering and that too small average crystalline grain diameter causes a decrease in productivity. The average crystalline grain diameter is preferably 1 μm or more and more preferably 1.5 μm or more.

According to the present invention, the vacancy rate P represented by $(d_i-d_s) \times 100/d_i$, where $d_i$ denotes a theoretical density of the ferrite sintered body of the Y-type ferrite and $d_s$ denotes a sintered body density, is 4 or more. Here, the theoretical density is obtained by an X-ray diffraction method. From the viewpoint that high initial permeability is to be obtained, the vacancy rate of the ferrite sintered body is preferably low. However, when the magnetic material antenna is to be fabricated, it is important that the loss factor tan δ is low at high frequencies, which can be effectively achieved by making the vacancy rate P be a predetermined value or more. If the vacancy rate P is increased, the loss factor decreases and, if the vacancy rate P is 4% or more, the loss factor decreases relatively. Therefore, by making the vacancy rate P be 4% or more, the strength of the sintered body is maintained to effectively achieve the reduction of the loss factor. Especially, by making the vacancy rate P exceed 6%, the loss factor is made greatly small, which enables the ferrite sintered body to be suitably used for the magnetic material antenna to be obtained. By using a ferrite sintered body having a large vacancy rate and a small loss factor, a wide-band and high-gain magnetic material antenna can be realized. Moreover, when the vacancy rate is within the values described above, the volume resistivity becomes high, which enables the volume resistivity being not less than $1 \times 10^4$ Ω·m to be advantageously obtained. In the case of the ferrite sintered body to be used for an antenna, such high volume resistivity as a transformer receiving high power is not required, however, insulation properties between wirings making up the antenna is required. To ensure this insulation properties, it is preferable that the volume resistivity is not less than $5 \times 10^3$ Ω·m and, when stability is taken into consideration, it is more preferable that the volume resistivity is not less than $5 \times 10^4$ Ω·m. By using a ferrite sintered body having a high volume resistivity, it is made possible to directly dispose a conductor on a surface or in an internal portion of the ferrite sintered body to constitute a magnetic material antenna. Moreover, if the vacancy rate is 8% OT more, the loss factor at 1 GHz becomes not more than 0.1 and, on the other hand, if the vacancy rate is less than 4%, the loss factor is 0.14. This means that, by making the vacancy rate be not less than 8%, the loss factor can be reduced by 0.04 or more. The use of the ferrite sintered body having the above characteristics for the antenna is attributable to the improvement of a gain of an antenna used in a band of frequencies of several hundred MHz. Additionally, the above vacancy rate is 15% or less, however, preferably 12.8% or less. If the vacancy rate becomes too high, the initial permeability lowers and the strength of the sintered body is also reduced greatly. That is, in the ferrite sintered body for an antenna, the balance between the loss factor and initial permeability is important and, therefore, the vacancy rate P is preferably controlled so as to fall within the above range. It is preferable that the vacancy rate is 9 to 11%. The ferrite sintered body of the present invention can be produced by a normal production process and the vacancy rate P can be controlled according to calcining temperatures, sintering temperatures, compositions, additives, or the like. For example, when Cu is made to be contained in the ferrite sintered body, the sintering properties are changed, thereby controlling the vacancy rate by the addition of Cu.

When the magnetic material antenna is to be fabricated, in order to realize a small-sized and wide-band antenna, it is preferable that permeability is high, however, to achieve sufficient performance of the antenna such as high gain, it is necessary that loss factor is small in particular. From this point of view, in the case of the antenna to be used in high frequencies being several hundred MHz, the loss factor at 1 GHz is preferably 0.05 or less. However, all that is needed is that the loss factor is simply low in a frequency band to be operated and, therefore, if the loss factor of the ferrite sintered body is 0.05 or less at the frequency of 770 MHz, the ferrite sintered body can be used as an antenna for digital terrestrial broadcasting which uses the frequency band between 470 to 770 MHz. Also, when the loss factor of the ferrite sintered body at 470 MHz is 0.05 or less, the ferrite sintered body can be used for the antenna to be used in digital terrestrial broadcasting using a band of frequency of 470 MHz or less. The loss factor is 0.03 or less preferably at 470 MHz, more preferably at 770 MHz, and most preferably at 1 GHz.

The hexagonal ferrite of the present invention can be produced by the powder-metallurgy-like method which has been conventionally applied to the production of soft ferrite. The base material such as $BaCO_3$, $CO_3O_4$, and $Fe_2O_3$ weighed to obtain a target ratio and a trace component such as CuO are mixed. The mixing method is not limited to any one and the wet mixing is performed by using a ball mill (for example, for 4 to 20 hours) using pure water as a medium. The mixed powder is calcined at a specified temperature using an electrical furnace, a rotary kiln or the like to obtain calcined powder. It is preferable that a calcining temperature is 900 to 1300° C. and holding time is one to three hours. If the calcining temperature and holding time are less than these temperature and time, the reaction does not proceed sufficiently and, on the contrary, if these temperature and time exceed the above value, the efficiency of milling is decreased. The calcination is preferably performed under the existence of oxygen such as in an air atmosphere or in an oxygen atmosphere. The calcined power obtained as above is milled in a wet manner by using an attritor, ball mill, or the like and, after a binder such as PVA (Polyvinyl alcohol) is added, is granulated using a spray drier or the like to obtain granulated powder. An average grain diameter after being milled is 0.5 to 5 μm. After the obtained granulated powder is molded by a pressing machine, the molded powder is sintered at temperatures of, for example, 1100 to 1300° C. in an oxygen or air atmosphere for one to five hours by using an electric furnace to produce a ferrite sintered body. If the sintering temperature is less than 1100° C., the reaction does not proceed sufficiently and a high density of sintered body cannot be obtained and, if the sintering temperature exceeds 1300° C., excessive sintering phenomenon such as generation of coarse grains occurs. Also, short-time sintering causes no sufficient progress of the reaction and long-time sintering causes easy occurrence of excessive sintering and, therefore, the sintering time is preferably one to five hours. Moreover, not only compression molding but also extrusion molding may be employed for the molding processes. The extrusion molding is performed, for example, as follows. The material after being calcined and milled is mixed with a binder, plasticizer, lubricant, and water. The obtained mixture is extruded by a screw. The mixture is molded so as to have a predetermined shape using a metal mold having a cavity contracted in diameter in a direction of extrusion. The extruded substance is cut so as to have a predetermined length. If the green body, which contains a large amount of organic substances, obtained by the extrusion molding is used, the amount of the Co-rich phase of the sintered body obtained by baking becomes small. By using such methods as above, even if the method in which CuO is added to main components is employed, the content rate of the Co-rich phase can be made to be 0.5% or less. Therefore, from the viewpoint that the Co-rich phase is decreased, it is preferable that the extrusion molding is applied. By baking the prismic or cylindrical bar-like green body produced by extrusion molding and by forming a conductor such as electrode pattern or windings, the magnetic material antenna containing less Co-rich phase can be obtained. The configurations and manufacturing method described above may be widely applied not only to the magnetic material antenna but also an inductance part. Whenever necessary, processing such as cutting is performed on the obtained sintered body.

Here, the baking is preferably performed in the existence of oxygen to obtain a good sintered body density and magnetic characteristics and, therefore, is preferably performed in an air atmosphere. From the view point of productivity, however, sintering is preferably performed in the air. Normally, when the Y-type ferrite is sintered, if the baking is performed in an air atmosphere, oxygen is taken from the sintered body and, as a result, a state where the sintered body is short of oxygen on its surface in particular occurs, which causes the density of the sintered body to be hard to rise. By adding Cu, sufficient sintered body density and magnetic characteristics can be obtained in the sintering in an air atmosphere as in the case of sintering in an oxygen atmosphere. In the method of producing the ferrite sintered body of the Y-type ferrite including the mixing process to obtain mixed powder by mixing raw materials, process of calcining the mixed powder to obtain the calcined powder, process of milling the calcined powder to obtain milled powder, process of molding the milled powder to obtain a green body and process of baking the green body to obtain the calcined substance, by adding Cu during the mixing process or milled process and making the ferrite sintered body contain Cu, the sintering is allowed to be performed in an air atmosphere. Even in the atmosphere in which oxygen concentration is low, for example, even in air, good sintering property can be maintained, thus serving to improve the productivity of the sintered body. Even in the low oxygen concentration, sintering properties can be improved. It is preferable that the sintered body contains 1 to 1.5 wt % in CuO equivalent.

The ferrite sintered body of the present invention can be suitably used for the antenna. An antenna device can be fabricated by using the ferrite sintered body. The ferrite sintered body of the present invention can be suitably used, as a material, for not only antennas but also inductance elements for an inductor or transformer for communication used at high frequencies. Also, the ferrite sintered body can be suitably used, as a material for a delay circuit board on which wirings are formed. The antenna to which the ferrite sintered body can be applied is the magnetic material antenna using the ferrite sintered body, however, is not limited to any specified structure. For example, the antenna includes a chip antenna using a cuboid-shaped or cylindrical shaped ferrite sintered body or a microstrip antenna using a plate-shaped ferrite sintered body. However, when the antenna is used for a portable device such as a mobile phone, its mounting area is limited and, therefore, the ferrite sintered body is preferably applied to an antenna having a small mounting area. The ferrite sintered body is preferably used to a magnetic base body making up the magnetic material antenna. Its dimension may be determined depending on use conditions. For example, for a portable device, the ferrite sintered body having a longitudinal length being not more than 50 mm may be used. For smaller devices, the ferrite sintered body having a longitudinal length being not more than 30 mm can be used. The ferrite sintered body of the present invention can be suitably used for an antenna of digital terrestrial broadcasting using a band of frequency of 470 to 770 MHz. Now, by taking the above antenna as an example, the magnetic material antenna of the present invention is described. The shape of the magnetic base body is not limited to any specified one and may be cuboid-shaped, cylindrical shaped or the like. To realize stable mounting, the cuboid shape is preferable. Also, in order to make a resonant frequency be near to 550 MHz so that the antenna can be used in a band of frequencies being 470 to 770 MHz being used by digital terrestrial broadcasting, the magnetic base body is preferably 25 to 30 mm in length, 3 to 5 mm in width and 3 to 5 mm in height. If the dimension of the base body exceeds the range described above, the base body is too large to be classified as an surface-mounted type antenna.

By making up an antenna using the above ferrite sintered body, wide band antenna can be achieved. To use an antenna in a wide frequency band, it is necessary to lower a Q value of the antenna, however, the Q value is represented by the expression $(C/L)^{1/2}$, where L denotes inductance, C denotes capacitance and, therefore, it is necessary to raise the L value and to lower the C value. In the case where a dielectric is used as a base body, an increase of the number of windings is required to raise the inductance L, however, the increase in the number of windings causes an increase of a line capacitance and, therefore, the Q value of an antenna cannot be effectively lowered. To solve this problem, by using the magnetic material, the inductance L can be increased in proportion to permeability and not depends on the increase in the number of windings and, therefore, the increase of the line capacitance caused by the increase in the number of windings can be avoided and the Q value can be lowered, thereby enabling a frequency band of the antenna to be widened. Especially, by using the Y-type ferrite in which the permeability is maintained up to the GHz band, the frequency band of the antenna is widened so that the antenna can operate in the frequency band of several hundred MHz or higher. For example, as shown in FIG. 1, an helical antenna is made up of a base body 101 and a winding 102 and the frequency band can be widened by decreasing the number of windings. The helical electrode mounted on a base body surface with its winding direction set as a longitudinal direction of the base body can be used as an electrode and, by configuring the electrode like this, large inductance can be obtained. On the contrary, if the inductance is the same, miniaturization can be made possible without a large increase of the line capacitance. In this case, one electrode is formed by providing windings at a predetermined pitch and with a predetermined width of the electrode. The pitch and width of the electrode are determined depending on required antenna characteristics and set so that a distance between electrodes is sufficiently apart from each other in order to suppress the increase of the line capacitance, with taking into consideration that the base body becomes large in size. It is preferable, for example, that the distance between electrodes is 0.4 to 1 mm and the electrode width is 0.4 to 1 mm. Moreover, by changing a distance between electrodes in one helical electrode, a band can be made wider. As in the helical electrode, only one electrode may be formed and, as in the electrode to be used as a dual-band type antenna, two helical electrodes may be formed and, further, an electrode for grounding and an electrode for fixing may be formed in a separated manner. By making up an electrode by sandwiching a base body, a plate-shaped antenna may be fabricated.

Another example is shown in FIG. 2, as in the case shown in FIG. 1 where the antenna is fabricated by using a chip-like magnetic base, where the antenna is fabricated by making a bar-like conductor 2 pass through a magnetic base body 1 made up of a ferrite sintered body. The antenna can be used by being mounted on the base body. In some cases, not only the antenna fabricated by forming an electrode on a surface of the base body as shown in FIG. 1 but also an antenna configured so that a conductor passing through a magnetic base body protrudes from a magnetic base body is also called a chip antenna. FIG. 2 (*a*) shows a perspective view of the chip antenna, FIG. 2(*b*) shows a cross-sectional view of the chip antenna containing the conductor along the longitudinal direction, and FIG. 2(*c*) shows a cross-sectional view of the chip antenna disposed in a manner being vertical to the longitudinal direction. The bar-like conductor passes through the magnetic base body along the longitudinal direction of the magnetic base body 1. The bar-like conductor 2 shown in FIG. 2 is of a straight-line. That is, the straight-line conductor is placed, in an extended manner, along a face outside the base body such as a side face of a cuboid or a circumferential surface of a cylinder which is positioned in a manner to surround the conductor and passes between both the end portions of the base body in a longitudinal direction. As shown in FIG. 2, one end portion 3 of the conductor and another end portion 4 thereof protrude from the magnetic base body 1. The antenna device is so fabricated that one end 3 of the conductor makes up an open end and another end 4 of the conductor is connected to a control circuit (not shown) of a power feeding circuit or the like. Since there simply exists the straight-line-like solid conductor 2 as the conductor part, in an internal portion of the magnetic base body 1, resistance component is small, which provides an ideal structure to reduce capacitance components. The magnetic base body 1 has a structure of a closed magnetic path and, therefore, a magnetic field can be effectively utilized. Consequently, according to the structure as above, an allowable range of the loss factor of the ferrite sintered body to be used is wider with respect to a desired Q value. One piece of the conductor passes through the magnetic base body 1 and, therefore, the conductor in the internal portion of the magnetic base body, which serves as a radiation conductor, there is substantially no conductor portion therein opposing each other, thus reducing capacitance components effectively. From this point of view, the number of conductors passing through the magnetic base body is preferably only one. However, if the influence by capacitance components is minimized by providing a sufficient interval between conductors, besides one through-conductor, another additional conductor 2 may be configured to pass through the magnetic base body or another conductor may be buried therein. Further, since the conductor 2 passes through the magnetic base body 1, both the ends of the conductor 2 may be electrically connected to other circuit elements and/or electrodes, thereby providing freedom of design. It is preferable that the straight-line-like conductor passes through the base body keeping a specified distance from a face outside the base body such as a side face of a cuboid or a circumferential surface of a cylinder which is positioned in a manner to surround the conductor. In the configuration shown in FIG. 2, the conductor 2 passes through the central portion of the magnetic base body along the longitudinal direction of the magnetic base body. That is, the conductor 2 is positioned in the central portion in a cross section being vertical to the longitudinal direction of the magnetic base body. The magnetic base body, so long as an straight-line-shaped conductor passes through the magnetic base body along the longitudinal direction of the magnetic base body, may be not only of an cuboid shape but also an arc shape (arch shape). It is preferable that the conductor has no bending portion relative to the longitudinal direction. One end 3 and another end 4 of the conductor are made to be bent in a portion being apart from the magnetic base body 1 so that these ends 3 and 4 are simply secured to a fixing electrode (not shown) and power feeding electrode (not shown) on a board. By bending the conductor in the portion apart from the magnetic base body, the damage to the conductor and magnetic base body caused by the bending is prevented and by configuring as above, the capacitance components can be effectively reduced. An average gain of the antenna device is preferably −7 dBi or more and is more preferably −5 dBi or more. The ferrite sintered body of the present invention can be suitably used when such average gains is to be achieved.

The antenna may be advantageously configured so as to have a plurality of antennas shown in FIG. 2 and straight-line-like conductors of the plurality of antennas are connected serially to one another. In the case where the straight-line conductor passes through the magnetic base body, the direction which revolves around the straight-line conductor is the magnetic path direction and, therefore, even portion of the magnetic base body is divided into a plurality of portions, the antenna having similar characteristics to that in the case where only one magnetic base body is used can be constructed. The straight-line conductors of each antenna is configured to be connected serially and, therefore, the conductor can be bended in connecting portions and its arrangement can be changed depending on mounting space. As a result, the above antenna can be effectively, in terms of usage of space, mounted on communication device or the like. The antenna is configured to be divided into a plurality of antennas and, therefore, each antenna device can be short in length as compared with the length of the magnetic body required to realize the antenna characteristics, thereby enhancing impact resistance. By further connecting additional straight-line like or plate-like conductors to the straight-line-like conductor shown in FIG. 2, an antenna in which radiation gain of an electromagnetic wave is enhanced may be constructed. Moreover, the magnetic base body having a through hole of the magnetic material antenna shown in FIG. 2 may be fabricated by the method by which the through hole is formed in the sintered body by machinery process, method by which a green body having the through hole is formed by compression molding or extrusion molding and is sintered, or the like. When there is a possibility that a big impact is given to the antenna or when reinforcement of strength of the antenna is required, the antenna may be housed in a resin case. The above antenna may be configured, based on its structure, so as to divide the magnetic base body into a plurality of portions in a longitudinal direction (C axis direction of a through hole). Therefore, by shortening a length of the magnetic base body in a longitudinal direction, impact resistance can be enhanced. In this case, the length in the longitudinal direction may be 15 mm or less.

Moreover, the antenna shown in FIG. 2 may be so configured that one end 3 of the conductor makes up an open terminal and another end 4 of the conductor is connected to control circuits such as a power feeding circuit or the like. In the embodiment shown in FIG. 3, an antenna 10, a fixing electrode 5, and a grounding electrode 9 are arranged in □-shaped manner. One end 3 of the conductor protruded from the magnetic base body 1 is connected to one end of the fixing electrode 5 and another end of the conductor protruded from the magnetic base body 1 is connected to one end of the power feeding electrode 6. By forming another end of the fixing electrode 5 on the side of the open end of the antenna 10 so as to be apart from the grounding electrode 9, capacitance components are made to appear. The antenna has a structure in which the capacitance components are greatly reduced, however, when the capacitance components are not sufficient to obtain a desired antenna characteristic, by using the method described above, the capacitance components are added to adjust the antenna characteristics. When compared with the method in which the capacitance components of the antenna itself is adjusted, by employing the above method, the adjustment of capacitance components can be easily performed. The resonant frequency of the antenna can be adjusted by the method in which at least one capacitor and at least one switch are connected between the fixing electrode 5 and grounding electrode 9 for switching or in which a variable capacitance diode (varactor diode) is connected to perform adjustment by changing electrostatic capacitor using the applied voltage until a predetermined resonance frequency is obtained. Moreover, in the example shown in FIG. 3, in order to cover a wide frequency band, a matching circuit 22 to adjust a resonant frequency of the antenna device is disposed between the antenna and power feeding circuit. By switching the matching circuit 22 to move a resonant frequency of the antenna device, an operating band may be changed. The matching circuit for impedance matching is made to have a function of adjusting a resonant frequency of the antenna device. As the matching circuit 22, one as shown in FIG. 4 (*a*) can be used. In the example shown in FIG. 4(*a*), an inductor L2 is connected between another end of the capacitor C1 whose one end is connected to the ground and another end of the inductor L1 to make up the matching circuit. The conductor of the antenna is connected to another end of the capacitor C1 and the power feeding circuit is connected to another end of the inductor L2. A plurality of matching circuits each having a different inductance value of the inductor L2 is disposed in a manner in which matching circuits can be switched one another.

FIG. 9 shows results from evaluation of dependence on a loss factor tan δ of the antenna internal lose appearing when initial permeability is changed by using the antenna device shown in FIG. 3. Here, the antenna internal loss represents a value obtained by converting a total value of a material loss of a base body and a conductor loss into an antenna gain. The magnetic base body 1 is 30 mm in length, 3 mm in width, 3 mm in height and the conductor made of cupper passing through a central portion of the magnetic material 1 is 0.5 mm square. An interval between the magnetic base body 1 and grounding electrode 9 is 11 mm. The matching circuit is made up of the circuit shown in FIG. 4(b) and the capacitance of the capacitor C1 is 0.5 pF, inductance of the inductor L1 is 56 nH and inductance of the inductor L3 is 15 nH. The smaller the loss factor becomes, the smaller the antenna internal loss becomes. Moreover, There is a tendency that, if the initial permeability becomes larger, the antenna internal loss also becomes larger, however, when the initial permeability is within a range from 2 to 3, by making the loss factor tan δ be 0.05 or less, the antenna internal loss can be made to be 0.5 dB or less. The antenna internal loss of being 0.5 dB is equivalent to about 10% of transmitting power which is a level being allowable as a loss of the base substance. Moreover, by making the loss factor be 0.04 or less, the antenna internal loss can be made to be 0.5 dB for the initial permeability up to 4 and the antenna internal loss be 0.5 dB or less and, by making the loss factor be 0.03 or less, and the antenna internal loss be 0.5 dB for the initial permeability up to 5. In order to obtain an average gain of the antenna being −7 dBi or more, the loss factor is preferably 0.05 or less. By lowering the loss factor to 0.03 or less in particular, a high gain antenna can be achieved.

The antenna using the ferrite sintered body and the antenna device constructed by using the antenna is used in communication devices. For example, the antenna and antenna device can be applied to communication devices such as a mobile phone, wireless LAN, personal computer, digital terrestrial broadcasting related devices and, in the communication using these devices, its frequency band is widened. Since the frequency band to be used in the digital terrestrial broadcasting is wide, the communication devices using the antenna device of the present invention are suitably used in the applications. Especially, by using the antenna device of the present invention, the increase of a mounting area and mounting space can be suppressed and, therefore, the antenna device is suitably used in mobile phones, portable terminal, or the like. FIG. 5 shows examples in which mobile phones are used as the communication devices using the antenna device described above. In the FIG. 5 (b) showing the state the mobile phones are being unfolded, the position of the buried antenna is shown by dotted lines. As shown in a cross section in FIG. 5(a), in the mobile phone 25, an antenna 10 is attached to the board 27 to be connected to a wireless module 26. The arrangement position of the antenna 10 is not limited to the configuration shown in FIG. 5. The antenna 10 may be attached on an another end side or may be arranged in the display unit 23.

Hereinafter, the present invention is described by referring to an embodiment specifically, however, the present invention is not limited to the embodiment.

EMBODIMENTS

Embodiment 1

A material obtained by adding 0.6 weight parts of CuO with respect to 100 weight part of main components including $Fe_2O_3$, BaO ($BaCO_3$ was used), and CoO ($Co_3O_4$ was used) as main components and containing 60 mol %, 20 mol %, and 20 mol %, respectively was mixed by a wet ball mill using water as a medium for 16 hours.

Next, the mixed powder, after being dried, was calcined at 900 to 1200° C. in an air atmosphere for two hours and for the comparative example at 1100° C. also in an air atmosphere for two hours. The calcined powder was milled by the wet ball mill for 18 hours using water as a medium. To the milled powder obtained thus was added the 1% polyvinyl alcohol (PVA) binder and then granulated. After the granulation, the granulated substance was compression molded into a ring-shaped and cuboid-shaped substance and then sintered at 1160 to 1200° C. in an air atmosphere or in an oxygen atmosphere at 1180 to 1240° C. in the air atmosphere for three hours to obtain a sintered body having a different vacancy rate. The sintered body density, initial permeability $\mu_i$ and loss factor tan δ at a temperature of 25° C. and at a frequency of 1 GHz of the obtained ring-shaped sintered body being 7.0 mm in outer diameter, 3.5 mm in inner diameter, 3.0 mm in height were measured. Its density was measured by a water displacement method and initial permeability $\mu_i$ and loss factor tan δ were measured by using an impedance gain phase analyzer (Hewlett Packard, 4291B).

The result from X-ray diffraction on the sintered body showed that the constituent phase having the maximum main peak was Y-type ferrite and the Y-type ferrite was main phase. The vacancy rate P represented by the expression of $[(d_i-d_s)\times 100/d_i]$ was calculated from an X-ray theoretical density $d_i$ and sintered density $d_s$ and the result from evaluation of the relation between the vacancy rate P and loss factor tan δ and the relation between the vacancy rate P and initial permeability $\mu_i$ are shown in FIG. 6 and FIG. 7. In the above composition, the X-ray theoretical density $d_i$ is $5.4\times10^3$ kg/m³. As shown in FIG. 6, the loss factor decreases as the vacancy rate P increases. Especially, when the vacancy rate P becomes 4% or more, the loss factor decreases greatly and, when the vacancy rate P exceeds 6%, the loss factor decreases rapidly and, when the vacancy rate P becomes 8% or more in particular, the loss factor becomes 0.1 or less. When the vacancy rate P becomes 9% or more, the loss factor becomes an extremely low value. On the other hand, as shown in FIG. 7, the initial permeability decreases as the vacancy rate increases and, when the vacancy rate P becomes 6% or more, the initial permeability decreases greatly. When the vacancy rate P exceeds 15% in particular, the initial permeability is lowered to 2.0. If the vacancy rate P becomes 11% or less, the initial permeability becomes 2.2 or more and maintains a value being 10% higher or more from the minimum value.

Embodiment 2

Next, a material obtained by adding weight parts of CuO shown in Table (No. 1 to 5) with respect to 100 weight parts of main components including $Fe_2O_3$, BaO ($BaCO_3$ was used), and CoO ($CO_3O_4$ was used) as main components and containing 60 mol %, 20 mol %, and 20 mol %, respectively, were mixed by a wet ball mill using water as a medium for 16 hours. Moreover, another material mixture serving as a comparative example of the Z-type ferrite including $Fe_2O_3$, BaO ($BaCO_3$ was used), and CoO ($Co_3O_4$ was used) as main components and containing 70.6 mol %, 17.6 mol %, and 11.8 mol %, respectively, were mixed by a wet ball mill using water as a medium for 16 hours.

Then, the mixed powder, after being dried, was calcined in an air atmosphere at 1000° C. for two hours and the comparative material was calcined in an air atmosphere at 1100° C. for two hours. The powder obtained by calcination was milled by a wet ball mill by using water as a medium for 18 hours. To the milled powder was added a binder of 1% PVA to be granulated. After granulation, the granulated powder was pressed to ring shape or cuboid shape and then sintered in an oxygen atmosphere at 1200° C. for two hours and the comparative substance also was sintered in the oxygen atmosphere at 1300° C. for three hours. The sintering density, initial permeability $\mu_i$ and loss factor tan δ of the obtained sintered body by the same way as in the Embodiment 1 were evaluated. The results are shown in Table 1 and Table 2. Also, the volume resistivity was calculated by forming a Cr/Cu film by using a sputtering device on an upper and lower surface of a disk-like sintered body being 13 mm in diameter and 2 mm in thickness and by measuring by an insulation resistance tester. By mirror-polishing the sintered body and observing the polished surface by the SEM at 3500-fold magnification, an area rate of the Co-rich phase was calculated. These results were shown in the Table 1. Moreover, the average crystal grain diameter of the Y-type ferrite phase obtained from an SEM observation image and an average diameter of a vacant hole are shown in Table 1. Moreover, the average crystalline grain diameter and average grain diameter were calculated by averaging a maximum diameter of a grain of each phase in an image observed at 3500-fold magnification.

X-ray Analysis), the Y-type ferrite phase 103 contained 21.8 wt % in terms of BaO, 10.2 wt % in terms of CoO, 67.9 wt % in terms of $Fe_2O_3$, 0.0 wt % in terms of CuO. On the other hand, the Co-rich phase 105 contained 4.2 wt % in terms of BaO, 26.4 wt % in terms of CoO, 68.2 wt % in terms of $Fe_2O_3$, and 1.2% in terms of CuO. The Co-rich phase 105, when compared with the Y-type ferrite phase, is the substantially Ba-poor and Co-rich phase. The rate of Co is twice or more larger than that of the Y-type ferrite phase. The Cu content in the Y-type ferrite phase is smaller than the Cu content in the Co-rich phase. The result from the TEM (Transmission Electron Microscope) analysis showed that the Co-rich phase was a cubic crystal. In the material having the vacancy rate of 8% or more, in any case, the loss factor is 0.1 or less. When the amount of addition of CuO is 1.0 weight parts or less, the loss factor becomes 0.05, however, if the amount of addition of CuO is 1.0 weight parts, the average crystalline grain diameter becomes larger to exceeds 2 μm and an area rate of the Co-rich phase exceeds 1%. If the content of CuO is 0.6 weight parts or less, the average crystal grain diameter becomes 2 μm or less, the area rate of the Co-rich becomes 1% or less and the loss factor becomes 0.04 or less. On the other hand, in the material in No. 6 in which the Z-phase serves as a main phase, the loss factor becomes larger in particular.

TABLE 1

| Material No | CuO Weight part) | Resistivity × $10^4$ (Ω·m) | Vacancy rate (%) | $\mu_i$ (1 GHz) | tan δ (1 GHz) | Average crystal grain diameter (μm) | Co-rich phase area rate (%) | Average Co-rich phase area rate (μm) | Average vacancy diameter (μm) |
|---|---|---|---|---|---|---|---|---|---|
| 1 | 0 | 0.9 | 13.8 | 2.1 | 0.01 | 1.4 | 0.6 | 0.8 | 1.7 |
| 2 | 0.2 | 1.3 | 12.8 | 2.1 | 0.02 | 1.7 | 0.6 | 0.8 | 1.0 |
| 3 | 0.6 | 2.2 | 8.8 | 2.8 | 0.04 | 1.9 | 0.9 | 1.1 | 0.8 |
| 4 | 1.0 | 6.2 | 7.4 | 2.7 | 0.05 | 2.1 | 2.2 | 1.2 | 0.5 |
| 5 | 2.0 | <0.5 | 4.7 | 3.4 | 0.07 | 2.9 | 3.2 | 1.6 | 0.4 |
| 6 | — | <0.5 | — | 7.5 | 0.90 | — | — | — | — |

As a result from the X-ray diffraction, in materials in No. 1 to No. 5, a constituent phase having a maximum peak strength was Y-type ferrite and the Y-type ferrite was the main phase. On the other hand, in material No. 6 the constituent having a maximum peak strength was Z-type ferrite and the Z-type ferrite was the main phase. As shown in Table 1, as an amount of addition of CuO increases, permeability rises, however, an average crystalline grain diameter becomes large, the size of the Co-rich phase and its ratio increase, thereby raising the loss factor. On the other hand, the average diameter of a vacant hole becomes small as an amount of addition of CuO increase and, if the amount of addition of CuO becomes not less than 0.2 weight part, the diameter becomes 1 μm or less. The sintered bodies in No. 1 to 4 exhibited volume resistivity of 1×$10^4$Ω·m or more. The ferrite sintered body s in No. 2 to 4 exhibited volume resistivity of 1×$10^4$Ω·m or more, however, the ferrite sintered body in No. 5 exhibited volume resistivity of less than 0.5×$10^4$Ω·m. The SEM observation image of the ferrite sintered body in No. 3 are shown in FIG. 8 where, in the Y-type ferrite phase 103, not only the vacant hole 104 but also the Co-rich phase 105 can be seen. According to an element analysis using an EDX (Energy Dispersive Embodiment 3

The materials including $Fe_2O_3$, $BaCO_3$, and $Co_3O_4$ obtained by weighing so as to have compositions (No. 7 to 13) represented by $Ba_2Co_{2-x}Cu_xFe_{12}O_{22}$ (x=0.08, 0.12, 0.15, 0.20, 0.50, 0.75, 1.00) was mixed by a wet ball mill using water as a medium for 16 hours. Next, the mixture, after being dried, was calcined in an air atmosphere at 1000° C. for two hours. The calcined powder was milled by a wet ball mill using water as a medium for 18 hours. To the milled powder obtained thus was added a 1% PVA binder to be granulated. After the granulation, the granulated substance was compression molded into a ring-shaped and cuboid-shaped substance and then sintered at 1200° C. in an oxygen atmosphere for three hours. The vacancy rate, initial permeability $\mu_i$, loss factor tan δ, volume resistivity, area rate of Co-rich phase, average grain diameter of the Co-rich phase of the obtained sintered body were evaluated by the same way as in Embodiments 1 and 2. The result from the evaluation are shown in Table 2. Since the volume resistivity of the sintered body No. 12 having an amount of CuO substitution x being 0.75 and of sintered body No. 13 having an amount of CuO substitution x being 1.00 were lowered respectively to 0.4×$10^4$Ω·m and 0.2×$10^4$Ω·m, further evaluation was omitted accordingly.

TABLE 2

| Material No | CuO (x) | Resistivity × 10⁴ (Ω·m) | Vacancy rate (%) | $\mu_i$ (1 GHz) | tan δ (1 GHz) | Co-rich phase area rate (%) | Average Co-rich phase diameter (μm) |
|---|---|---|---|---|---|---|---|
| 7 | 0.08 | 3.2 | 12.4 | 2.7 | 0.04 | 0.3 | 1.4 |
| 8 | 0.12 | 6.3 | 10.8 | 2.7 | 0.04 | 0.1 | 1.0 |
| 9 | 0.15 | 3.0 | 7.8 | 2.7 | 0.04 | 0.4 | 1.6 |
| 10 | 0.20 | 6.2 | 6.1 | 2.8 | 0.05 | 0.3 | 1.5 |
| 11 | 0.50 | 1.7 | 4.5 | 3.2 | 0.11 | 0.8 | 1.5 |

As shown in Table 2, as the amount of CuO substitution x increases, the vacancy rate decreases and permeability increases. If the amount of CuO substitution x is 0.12 or more, the vacancy rate becomes 11% or less and the strength of the sintered body is improved. On the contrary, if the vacancy rate increases to exceed 6%, the loss factor is rapidly lowered to 0.05 or less. If the amount of CuO substitution x becomes 0.15 or less, the loss factor becomes 0.04 or less. The composition of the third embodiment differs from the second embodiment in which CuO is added to a main component in that, even if an amount of CuO increases, an area rate of the Co-rich phase does not increase greatly. It is understood from the third embodiment that it is preferable from the viewpoint of vacancy rate and loss factor that an amount of CuO substitution x is 0.20 or less. On the other hand, if the amount of CuO substitution x exceeds 0.2, the loss factor increases and, in the No. 11 example whose x value exceed 0.4, the loss factor exceeds 0.1. Also, when the amount of CuO substitution x is 0.20 or less, the volume resistivity is still kept at 3.0×10⁴ Ω·m, however, if the amount of CuO substitution x exceeds 0.2, the volume resistivity decreases greatly and, if the amount of CuO substitution x is 0.60 or more, the volume resistivity becomes 1.7×10⁴ Ω·m or less.

Embodiment 4

A material obtained by adding 0.6 weight parts of CuO with respect to 100 weight part of main components including $Fe_2O_3$, BaO ($BaCO_3$ was used), and CoO ($Co_3O_4$ was used) as main component containing 60 mol %, 20 mol %, and 20 mol %, respectively, was mixed by a wet ball mill using water as a medium. Next, the mixed powder, after being dried, was calcined in an air atmosphere at 1000° C. for 1.5 hours. The calcined powder was milled by a wet ball mill using water as a medium for 10 hours. The milled powder to which water, binder, lubricant, and plasticizer were added was extrusion molded. The green body thus obtained, after being dried, was sintered in an air atmosphere at 1150° C. for three hours to obtain a cuboid-shaped sintered body being 10 mm×3 mm×3 mm in size. The comparative sintered body using compression molding was prepared as follow. The calcined powder having the same composition as that used in extrusion molding was milled by a wet ball mill using water as a medium for 18 hours. The milled powder thus obtained, after the 1% PVA was added thereto, was granulated. The granulated substance was compression molded and then was sintered at 1200° C. for three hours to obtain a cuboid-shaped sintered body being 10 mm×3 mm×3 mm in size. An area rate of the Co-rich phase being a secondary phase in these sintered body was evaluated. The area rate of the Co-rich phase of the sintered body obtained by using the compression molding was 0.8%, while the area rate of the Co-rich phase of the sintered body obtained by using the extrusion molding was 0.4%. By employing the extrusion molding, the Co-rich phase was reduced to one half.

Embodiment 5

A magnetic material antenna was fabricated having a structure shown in FIG. 1 by using the No. 3 and No. 6 ferrite sintered bodies and its antenna properties were evaluated. First, the sintered body was worked so as to be 15 m×3 m×3 m in size. After Ag—Pt paste was printed on the surface of the sintered body and baking was performed on the printed substance to form an electrode having a helical structure with an electrode width being 0.8 mm, electrode interval being 0.5 mm, and number of windings being 8 for fabrication of the antenna. By mounting these antennas on a board and by connecting one end of the helical electrode to a power feeding electrode, the antenna properties (antenna gain and resonant frequency) were evaluated by an antenna gain evaluating device using a network analyzer.

TABLE 3

| Material No. | Antenna properties | |
|---|---|---|
| | Maximum gain (dBi) | Resonant frequency (MHz) |
| 3 | −3.1 | 690 |
| 6 | −18.5 | 400 |

As shown in Table 3, the antenna using the No. 3 ferrite sintered body of the Y-type ferrite which contains 0.6 weight part of Cu and whose vacancy rate P is 8.8% and whose loss factor is 0.06% or less exhibited excellent antenna properties having the maximum gain of −7 dBi. On the other hand, the maximum gain of the antenna fabricated by using the Z-type ferrite sintered body having its loss factor of 0.90 is remarkably less than −7 dBi and as low as −18.5 dBi.

Embodiment 6

The magnetic material antenna shown in FIG. 2 was fabricated by using the No. 3 ferrite sintered body of Y-type ferrite as follows. Cuboid-shaped magnetic materials of 30×3×1.25 mm and 30×3×1.75 mm were produced from the sintered body by machinery working. A groove having a width of 0.5 mm and a depth of 0.5 mm was formed, in the magnetic material being 30×3×1.75 mm in size, in a center of a face of 30×3 mm in a width direction. After a cupper wiring being 0.5 square and 40 mm in length was inserted as a conductor into the groove, the magnetic material was bonded with an epoxy adhesive ("ARCOM BOND" by Arcom Corp.). The adhesive was applied on a surface where magnetic materials were bonded together. A through-hole having 0.5 mm in vertical length and 0.5 mm in horizontal length was formed and the base body obtained by bonding was 30×3×3 mm in size. To perform a comparative study with the case of using the dielectric antenna, a dielectric antenna was fabricated as follow. A cuboid-shaped material being 30×3×3 mm in size was obtained from the sintered body of permittivity being 21 by machinery working. After Ag—Pt paste was printed on the surface of the sintered body and baking was performed on the printed substance to form an electrode having a helical structure with an electrode width being 0.8 mm and number of windings being 15.75 for fabrication of an antenna (antenna 2).

By mounting each of the antenna 1 and 2 on a board on which a power feeding electrode was formed and by connecting one end of the electrode to a power feeding electrode, the antenna device was fabricated (antenna devices 1 and 2). As the antenna 1, the antenna device having configurations shown in FIG. 3 was used. That is, on the printed circuit board were formed the power feeding electrode, grounding electrode, and fixing electrode (in a place being apart from the grounding). The width and the length of the fig electrode were 4 mm and 13 mm respectively. The gap between the end portion of the fixing electrode in a longitudinal direction and grounding electrode was 1 mm. The grounding electrode was formed so as to oppose to the entire antenna and the interval between the grounding electrode and the chip antenna was 11 mm. The matching circuit having the same configuration as shown in FIG. 4 (*a*) were disposed. The C1 was set at 1 pF, L1 at 12 nH, and L2 at 18 nH. The antenna properties, resonant frequency (frequency showing a gain maximum) of the antenna device were evaluated by mounting the measuring antenna 3 m apart from the measuring antenna (mounted on a right side of the antenna device in FIG. 3 (not shown)) and connecting the measuring antenna to the antenna gain evaluation device using a network analyzer through a coaxial cable of 50Ω. The longitudinal direction of the antenna shown in FIG. 3 was defined as "x", direction being orthogonal to the longitudinal direction as "y", direction being vertical to these direction, that is, direction being vertical to a surface of the board as "z". The results from measurement of vertically polarized wave on a zx plane (H plane) is shown in Table 4. The average gain bandwidth and maximum gain bandwidth are a frequency bandwidth at which an average gain and a maximum gain are not less than a predetermined value. The Table 4 shows a bandwidth with −7 dBi or more and a bandwidth with −5 bBi or more. As shown in Table 4, when compared with the antenna device 2 using a dielectric having permittivity being 20, in the antenna device 1 using a ferrite sintered body of Y-type ferrite having permittivity being 14, initial permeability being 2 or more at 1 GHz, and loss factor being 0.05 or less, the bandwidth was greatly improved and the effect of using the ferrite for an antenna can be confirmed. The bandwidth of the antenna device 1 having the gain being −7 dBi or more is 260 MHz or more. Moreover, Table 4 shows the characteristics of the antenna operating at 470 to 770 MHz and the gain region where −7 dBi or more and −5 dBi or more can be obtained reaches the region being less than 470 MHz and, therefore, the actual bandwidth is wider than the band width shown in Table 4.

Embodiment 7

In order to produce Y-type with almost stoichimetric composition, a material containing $Fe_2O_3$, $BaO$ ($BaCO_3$ was used), and $CoO$ ($Co_3O_4$ was used) and 60 mol %, 20 mol %, and 20 mol %, respectively, was mixed by a wet ball mill using water as a medium for 16 hours. Next, the mixed powder, after being dried, was calcined in an air atmosphere at 1000° C. for two hours. The calcined powder was milled by the wet ball mill using water as a medium for 18 hours. To the milled powder obtained thus was added a 1% PVA binder to be granulated. Next, a material obtained by adding 0.6 weight parts of $CuO$ or $ZnO$ with respect to 100 weight part of main components including $Fe_2O_3$, $BaO$ ($BaCOs$ was used), and $CoO$ ($Co_3O_4$ was used) and containing 60 mol %, 20 mol %, and 20 mol %, respectively, was mixed by a wet ball mill using water as a medium for 16 hours. Next, the mixed powder, after being dried, was calcined in an air atmosphere at 1000° C. for two hours. The calcined powder was milled by the wet ball mill using water as a medium for 18 hours. To the milled powder obtained thus was added a 1% PVA binder to be granulated. The above two compositions were compression molded after granulation and the obtained green body were sintered in an oxygen atmosphere at 1000° C. for two hours and a cuboid-shaped sintered body being 30 mm×3 mm×3 mm in size was obtained. In the case of stoichimetric composition without any additive, it is understood that baking in air is difficult since a surface state having loose density appears which is caused by oxygen missing occurring during the baking in air. On the other hand, in the case of containing Cu, even if baking is performed in an air atmosphere, the same surface property as originally obtained during the baking in the oxygen atmosphere occurs. That is, to contain Cu is advantageous when the baking in air is applied. Next, a material obtained by adding 0.6 weight parts of $CuO$ or $ZnO$ with respect to 100 weight part of main components including $Fe_2O_3$, $BaO$ ($BaCOs$ was used), and $CoO$ ($Co_3O_4$ was used) and containing 60 mol %, 20 mol %, and 20 mol %, respectively, was mixed by a wet ball mill using water as a medium for 16 hours. Then, the mixture, after being dried, was calcined in an air atmosphere at 1000° C. for two hours. The calcined powder was milled by the wet ball mill using water as a medium for 18 hours. To the milled powder was added 1% PVA to be granulated. The granulated substance was compression molded and the obtained green body further was sinterd in an oxygen or air atmosphere at 1000° C. for two hours and a ring-shaped sintered body being 7 mm in outer diameter, 3 mm in inner diameter, and 3 mm in thickness was obtained. In the case of containing Zn, if the baking was performed in an air atmosphere, the density of the sintered body becomes $4.71 \times 10^3$ kg/m$^3$ and the density becomes slightly low. On the other hand, it was found that, in the case of containing Zn, even if the baking was performed in an air atmosphere, the density became $5.25 \times 10^3$ kg/m$^3$ and the sub-

TABLE 4

| Antenna (device) No. | Resonant frequency (MHz) | Antenna properties (470~770 MHz) | | | |
|---|---|---|---|---|---|
| | | Average gain bandwidth [Frequency range] (MHz) | | Maximum gain bandwidth [Frequency range] (MHz) | |
| | | >−7 dBi | >−5 dBi | >−7 dBi | >−5 dBi |
| 1 | 590 | >268 [470~738] | >206 [470~676] | >296 [470~766] | >256 [470~726] |
| 2 | 650 | 100 [588~688] | 51 [617~668] | 126 [575~701] | 92 [595~687] | stance containing Cu could get high sintering property while the baking was performed in an air atmosphere. In this view point, the addition of Cu in particular is advantageous when the baking in an air atmosphere is performed.

EXPLANATION OF LETTERS OR NUMERALS

Figure 1:
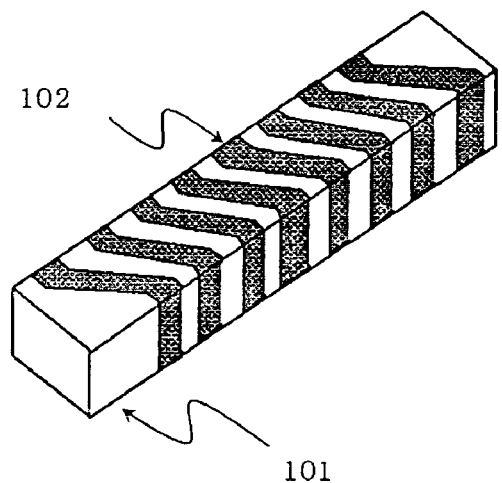
FIG. 1 is a diagram showing a magnetic material antenna of an embodiment of the present invention.
Figure 2:
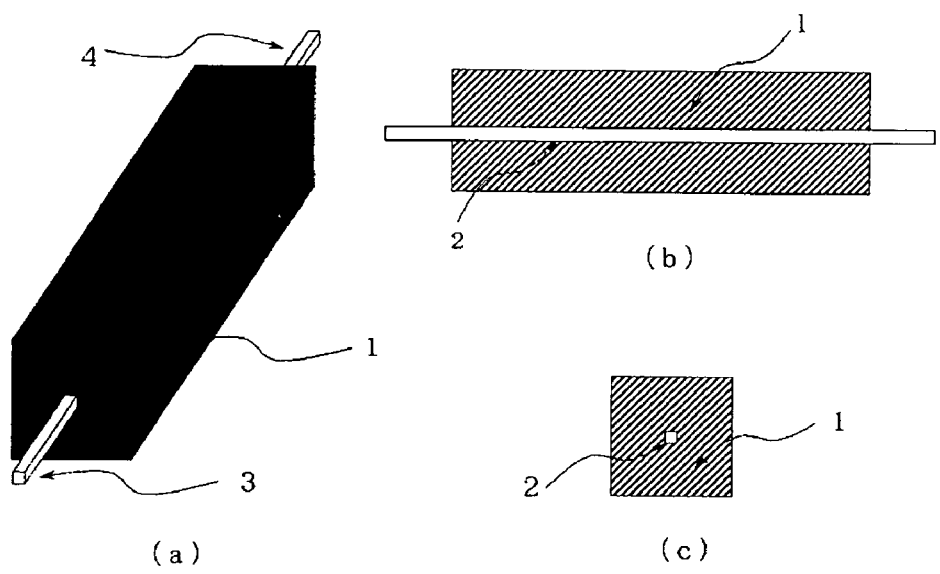
FIG. 2 is a diagram showing a magnetic material antenna of another embodiment of the present invention.
Figure 3:
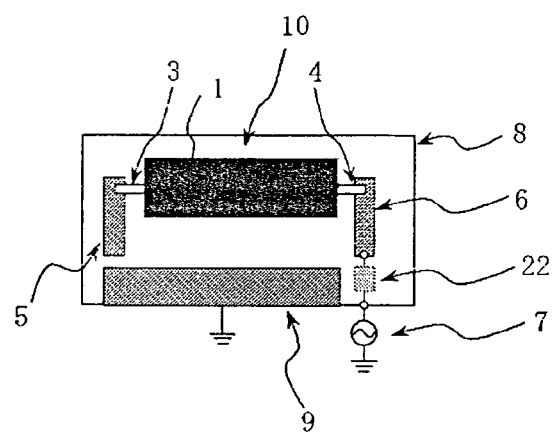
FIG. 3 is a diagram showing an antenna device using the magnetic material antenna of the present invention.
Figure 4:
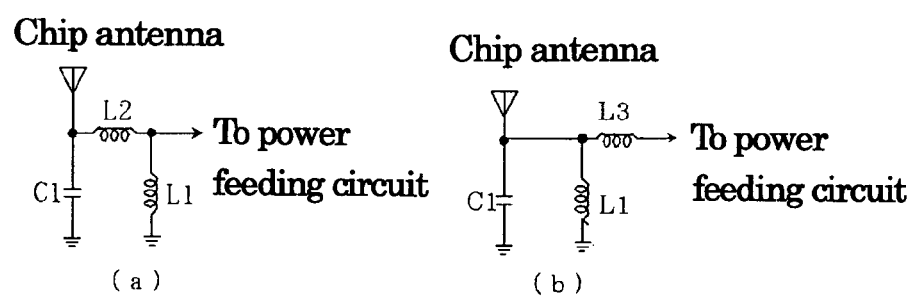
FIG. 4 is a diagram showing an example of a matching circuit to be used in the embodiment of the antenna device.
Figure 5:
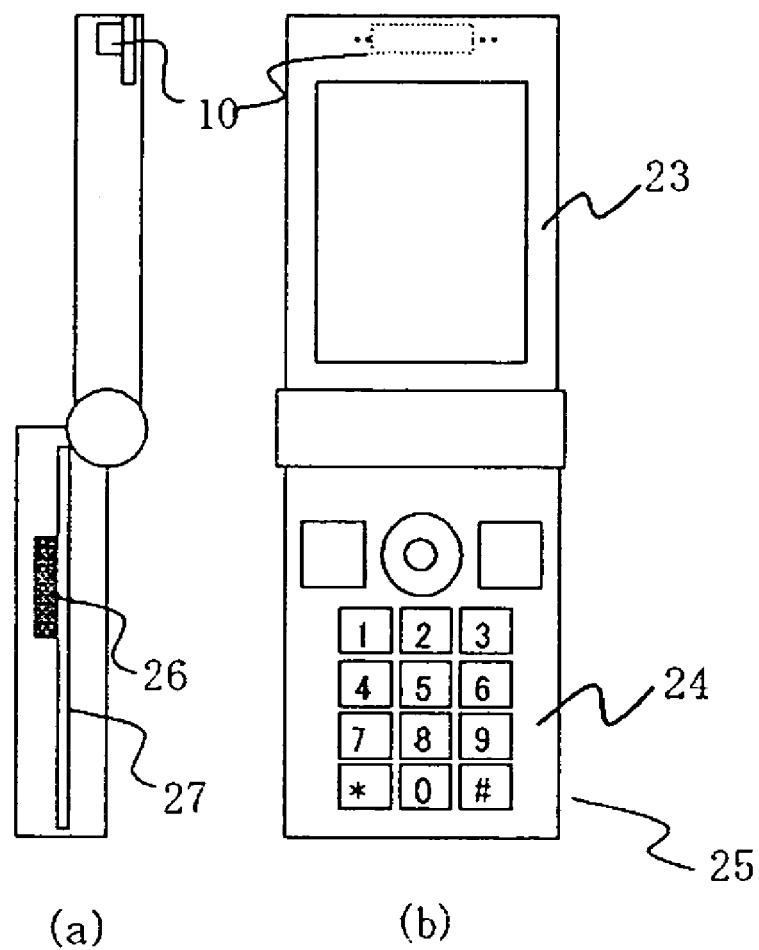
FIG. 5 is a diagram showing a mobile phone as an example of a communication device using the magnetic material antenna of the present invention.
Figure 6:
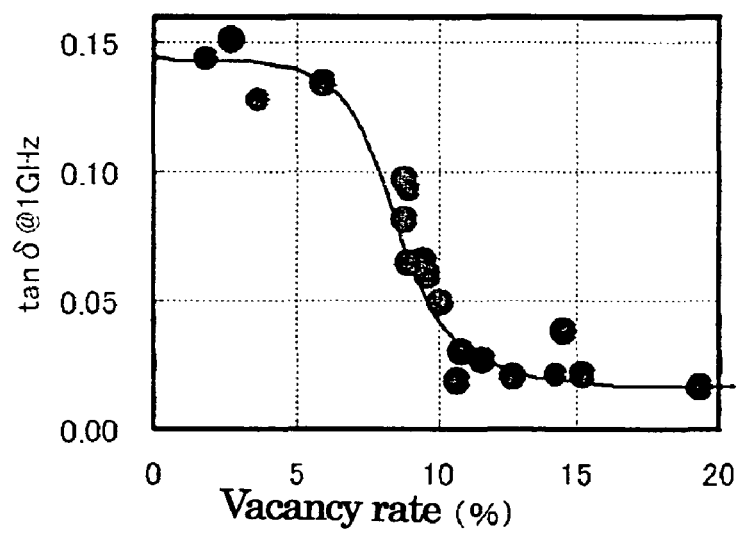
FIG. 6 is a diagram showing a relation between vacancy rate P and loss efficient tan $\delta$.
Figure 7:
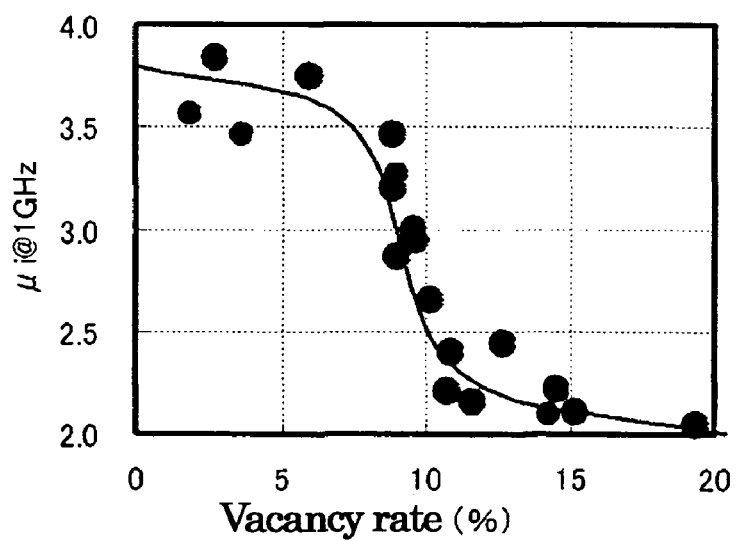
FIG. 7 is a diagram showing a relation between vacancy rate P and initial permeability $\mu_i$.
Figure 8:
FIG. 8 is a SEM (Scanning Electron Microscopy) observation image of ferrite sintered body of an example of the present invention.
Figure 9:
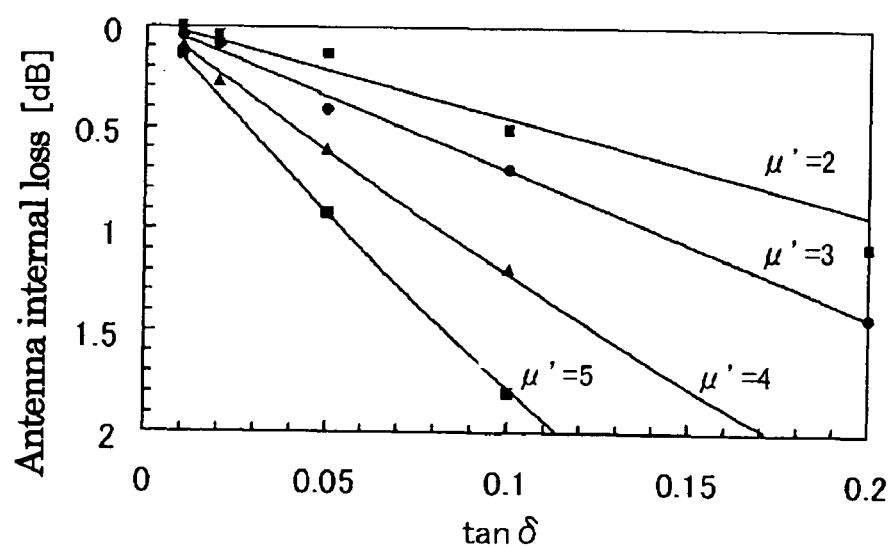
FIG. 9 is a diagram showing a relation between an antenna internal loss and loss efficient tan $\delta$.

1: Magnetic base body, 2: Conductor, 3: One end of conductor, 4: Another end of conductor, 5: Fixed electrode, 6: Power feeding electrode, 7: Power feeding circuit, 8: Board, 9: Grounding electrode, 10. Antenna, 22: Matching circuit, 23: Display unit, 24: Operating unit, 25: Mobile phone, 26: Wireless module, 27: Board, 101: Magnetic base body, 102: Windings, 103: Y-type ferrite phase, 104: Vacant hole, 105: Co-rich phase

The invention claimed is:

1. A magnetic material antenna using a ferrite sintered body comprising:
one or more conductors disposed at least on a surface or in an internal portion of the ferrite sintered body,
wherein the ferrite sintered body comprises a sintered body of Y-type ferrite containing BaO, CoO, and $Fe_2O_3$ as main components, and
wherein the ferrite sintered body contains Cu and, in a cross section for the sintered body, an area rate of a cubic Co-rich phase, which has a ratio of an amount of Co being higher than a Y-type ferrite phase being a mother phase, is 1% or less.

2. The magnetic material antenna according to claim 1, wherein a vacancy rate P of the ferrite sintered body represented by $(d_t-d_s)\times 100/d_t$, where $d_t$ denotes a theoretical density and $d_s$ denotes a sintered body density, is 4% or more.

3. The magnetic material antenna according to claim 1, wherein volume resistivity of the ferrite sintered body is $1\times 10^4$ $\Omega\cdot m$ or more.

4. The magnetic material antenna according to claim 1, wherein initial permeability at 1 GHz of the ferrite sintered body is 2 or more and loss factor tan $\delta$ is 0.05 or less.

5. The magnetic material antenna according to claim 2, wherein volume resistivity of the ferrite sintered body is $1\times 10^4$ $\Omega\cdot m$ or more.

6. The magnetic material antenna according to claim 2, wherein initial permeability at 1 GHz of the ferrite sintered body is 2 or more and loss factor tan $\delta$ is 0.05 or less.

7. The magnetic material antenna according to claim 3, wherein initial permeability at 1 GHz of the ferrite sintered body is 2 or more and loss factor tan $\delta$ is 0.05 or less.

8. A ferrite sintered body of Y-type ferrite containing BaO, CoO, and $Fe_2O_3$ as main components,
wherein Ba, Co, Cu, and Fe contained in the ferrite sintered body satisfies a compositional formula $Ba_2Co_{2-x}Cu_xFe_{12}O_{22}$ (x=0.05 to 0.2), and
wherein, in a cross section of the sintered body, an area rate of a cubic Co-rich phase, which has a ratio of an amount of Co being higher than a Y-type ferrite phase being a mother phase, is 1% or less.

9. The ferrite sintered body according to claim 8, wherein a vacancy rate P of the ferrite sintered body represented by $(d_t-d_s)\times 100/d_t$, where $d_t$ denotes a theoretical density and $d_s$ denotes a sintered body density, is 4% or more.

10. The ferrite sintered body according to claim 8, wherein volume resistivity of the ferrite sintered body is $1\times 10^4$ $\Omega\cdot m$ or more.

11. The ferrite sintered body according to claim 8, wherein initial permeability at 1 GHz of the ferrite sintered body is 2 or more and loss factor tan $\delta$ is 0.05 or less.

12. The ferrite sintered body according to claim 9, wherein volume resistivity of the ferrite sintered body is $1\times 10^4$ $\Omega\cdot m$ or more.

13. A ferrite sintered body containing BaO, CoO, and $Fe_2O_3$ as main components,
wherein the ferrite sintered body contains 0.1 to 0.6 weight parts of Cu with respect to 100 weight parts of the main components, and
wherein, in a cross section of the sintered body, an area rate of cubic Co-rich phase, which has a ratio of an amount of Co being higher than a Y-type ferrite phase being a mother phase, is 1% or less.

14. The ferrite sintered body according to claim 13, wherein Cu content in a Y-ferrite phase that the ferrite sintered body has is smaller than Cu content of the Co-rich phase.

15. The ferrite sintered body according to claim 13, wherein a vacancy rate P of the ferrite sintered body represented by $(d_t-d_s)\times 100/d_t$, where $d_t$ denotes a theoretical density and $d_s$ denotes a sintered body density, is 4% or more.

16. The ferrite sintered body according to claim 14, wherein a vacancy rate P of the ferrite sintered body represented by $(d_t-d_s)\times 100/d_t$, where $d_t$ denotes a theoretical density and $d_s$ denotes a sintered body density, is 4% or more.

17. The ferrite sintered body according to claim 13, wherein volume resistivity of the ferrite sintered body is $1\times 10^4$ $\Omega\cdot m$ or more.

18. The ferrite sintered body according to claim 14, wherein volume resistivity of the ferrite sintered body is $1\times 10^4$ $\Omega\cdot m$ or more.

19. The ferrite sintered body according to claim 13, wherein initial permeability at 1 GHz of the ferrite sintered body is 2 or more and loss factor tan $\delta$ is 0.05 or less.

20. The ferrite sintered body according to claim 14, wherein initial permeability at 1 GHz of the ferrite sintered body is 2 or more and loss factor tan $\delta$ is 0.05 or less.

\* \* \* \* \*